Jan. 7, 1941.  H. ZIEBOLZ  2,228,022
MOTION TRANSMISSION SYSTEM
Filed July 22, 1937
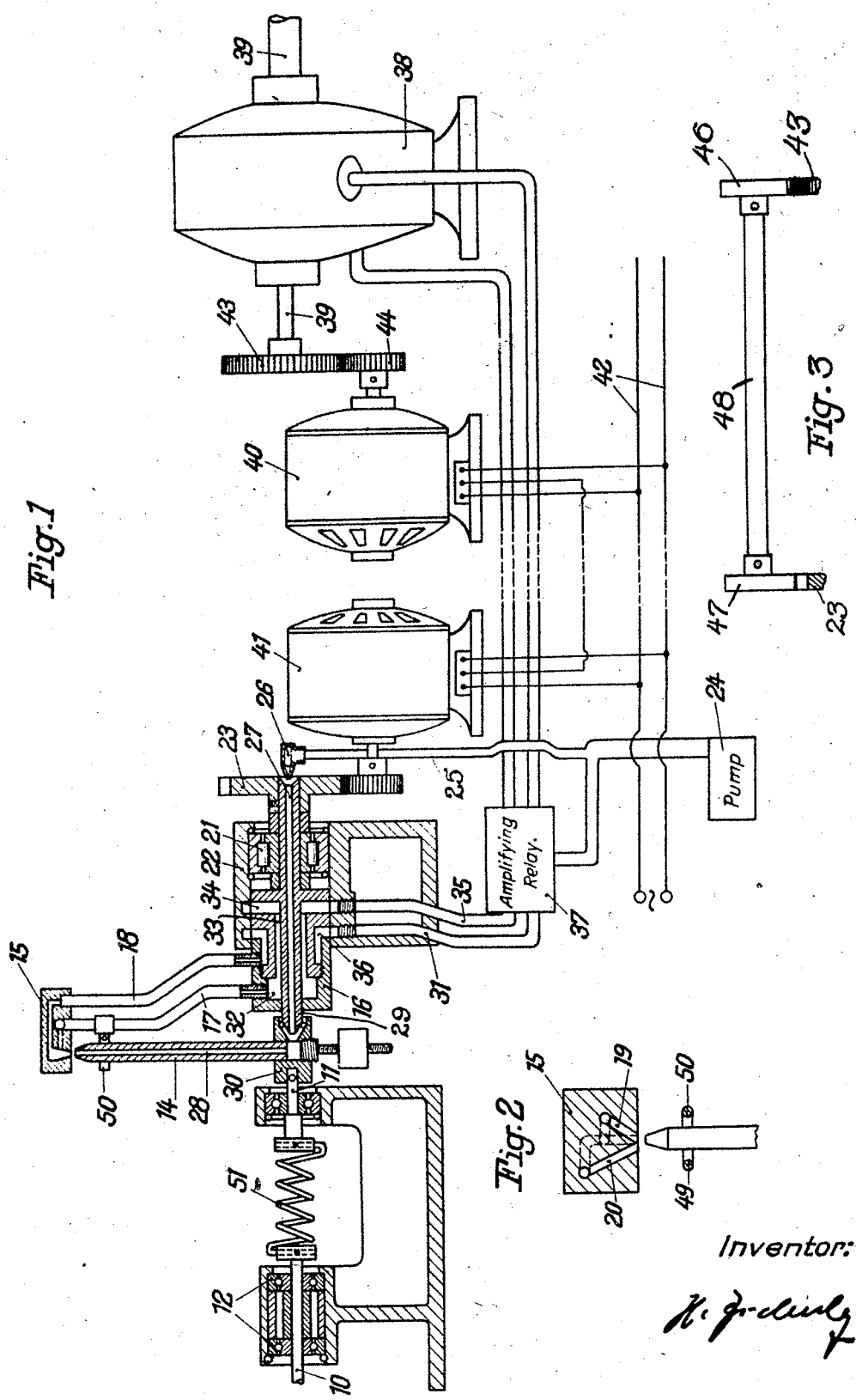
Inventor:

Patented Jan. 7, 1941

2,228,022

UNITED STATES PATENT OFFICE 2,228,022

MOTION TRANSMISSION SYSTEM

Herbert Ziebolz, Chicago, Ill., assignor to Askania Regulator Company, Chicago, Ill., a corporation of Illinois Application July 22, 1937, Serial No. 155,123
In Germany August 1, 1936

9 Claims. (Cl. 121—41)

This invention relates to motion transmission systems, more particularly to a system for reproducing at a distant point a primary motion introduced into the device.

It is an object of this invention to provide a system for converting a relatively weak rotary motion impulse, such as exerted by a pointer of a measuring instrument, for example, into a relatively strong rotary motion which may be used for operating devices consuming considerable power, such as control devices and the like.

It is a further object of this invention to provide a simple and reliable motion transmission system in which rotary impulses suddenly introduced into the system are accurately reproduced without a possible loss of one or several revolutions due to an inertia of the device.

Further aims, objects and advantages of this system will appear from a consideration of the description which follows with the accompanying drawing showing for purely illustrative purposes an embodiment of this invention. It is to be understood, however, that the description is not to be taken in a limiting sense, the scope of the invention being defined in the appended claims.

Referring to the drawing:

Fig. 1 is a diagrammatic illustration, partly in section, of a motion transmission system embodying the invention.

Fig. 2 shows, partly in section, a detail of a pressure fluid relay of Fig. 1.

Fig. 3 shows a modification of a detail of the system.

A rotary motion which may be exerted by a relatively weak measuring system (not shown) is introduced into the device by means of shafts 10 and 11 interconnected by a device later to be described. The shafts 10 and 11 are mounted for rotation in antifriction bearings 12 and 13 and connected to operate a pressure fluid relay shown in the embodiment as being of the "Askania" jet-pipe type. The relay comprises a primary relay element, a jet-pipe 14 mounted for full rotation and a secondary relay element, a reception orifice member or distributor block 15. The reception orifice member 15 is secured to a body 16 by means of pipes 17 and 18 leading to reception orifices 19 and 20 inside the member 15. The body 16 is rotatably mounted by means of an anti-friction bearing 21 in a support 22 and permits full rotation of the orifice member 15 coaxially to the jet-pipe 14. The body 16 is provided with a device for imparting a rotary motion to the same, a gear 23 secured to the body 16 being shown for this purpose.

Pressure fluid is supplied to the relay from a pump diagrammatically shown at 24 through a conduit 25 terminating in a nozzle 26 and issuing a jet of pressure fluid into a central bore 27 of the rotatable body 16. The bore 27 of the body communicates with a bore 28 of the jet-pipe. The body 16 is shown for this purpose as provided with a nozzle-shaped extension 29 extending into the interior of the hub 30 of the jet-pipe.

A differential pressure is set up in the reception orifices 19 and 20 of the orifice member 15 depending upon the relative position of the jet-pipe and the orifice member. The differential pressure is conducted through the pipes 17 and 18 into the interior of the rotatable body 16. The pipe 17 communicates with the pipe 31 through passages 32, 33 and 34 in the interior of the body 16 and the support 22, respectively. The pipe 18 communicates with the pipe 35 through a similar passage 36. It is thus evident that the differential pressure created in the rotatable reception orifice member 15 is transmitted into stationary pipes 31 and 35.

The differential pressure is utilized to operate either directly, or indirectly by means of an amplifier relay 37, a rotary motor 38 for reproducing the primary motion impulse applied at the shaft 10. The rotary motor 38 may be of a wellknown construction. For instance the motor comprises a rotor fastened to the motor shaft 39 and being provided with blades or vanes displaceably mounted in the rotor in direction radial to the rotor shaft 39. The rotor is eccentrically mounted in a casing to provide a chamber to the opposite sides of which the pipes 31 and 35 are connected. A pressure difference in the pipes 31 and 35 produced by a relative movement of the jet pipe 14 and the orifice member 15 effects in a wellknown manner a rotation of the vane or blade rotor to drive the motor shaft 39 in one or the other direction depending on the direction of the pressure difference in the pipes 31 and 35.

A power controlled device may be connected with the motor shaft 39.

For the desired operation it makes no difference whether an amplifier is inserted in the pipes 31 and 35. The amplifying relay shown as at 37 in Fig. 1 may be of any wellknown type as, for instance, an ordinary "Askania" jet pipe relay.

The motor 38 is further connected to the pressure fluid relay to insure a correct reproduction of the primary motion. An electrical motion transmission system consisting of a transmitter motor 40 and a repeater motor 41, both connected to power lines 42, may be used for this purpose if the motor 38 is located at a point distant from the pressure fluid relay. The transmitter motor is connected to the power shaft 39 by means of a step-up gear train 43 and 44. A corresponding step-down gear train 45 and 23 is provided at the pressure fluid relay.

Inasmuch as there is practically no load carried by the electrical motors, the motion introduced into the transmitter motor will be correctly reproduced by the repeater motor 41 turning the secondary relay element, the reception orifice member 15, to follow the positions of the primary element, the jet-pipe 14. The step-up and step-down gear trains further serve to reduce the torque on the electrical motors and a possible positional error resulting therefrom.

If the rotary motor 38 is positioned closely to pressure fluid relay, a direct motion transmitting member, such as gear 46, 47, and a shaft 48 indicated in dotted lines in the drawing may be used in place of the electrical motors 40 and 41.

In order to prevent that a relatively quick primary impulse moves the primary relay element through one or several entire revolutions before the secondary element is able to follow, and in order to eliminate a corresponding loss of motion caused thereby, the relative movement of the primary and secondary elements of the pressure fluid relay are restricted. Stops 49 and 50 are shown for this purpose. There is inserted between the operating shafts 10 and 11 a resilient device shown as being a helical spring 51 permitting several revolutions to be stored when quick primary impulses act on the relay.

The operation of the device is as follows:

A primary impulse applied to the shaft 10 causes a relative displacement between the primary and secondary elements of the pressure fluid relay. The stops 49 and 50 are so positioned that a maximum pressure impulse is created in the relay when the primary element is arrested by them. In response to the pressure impulse the rotary motor 38 is actuated turning the power shaft 39 and simultaneously causing the secondary element of the pressure fluid relay to follow the position of the primary element.

In case a sudden and quick impulse acts on the relay, the resilient member 51 stores the introduced primary motion and maintains the relay in the operating position until the rotary motor 38 and the secondary relay element has precisely reproduced the primary motion.

Obviously, the present invention is not restricted to the particular embodiment herein shown and described. Moreover, it is not indispensable that all the features of this invention used conjointly since they may be employed advantageously in various combinations and sub-combinations.

What is claimed is:

1. Motion transmission system comprising, in combination, a pressure fluid relay including a primary relay element mounted for full rotations about an axis and a secondary relay element mounted for full rotations coaxially to said primary element; means for limiting the relative movement between said primary and said secondary relay elements; rotary actuating means for actuating said primary relay element, said actuating means including a resilient member adapted to store an actuating motion exceeding the relative freedom between the relay elements; and a rotary pressure fluid motor controlled by said pressure fluid relay and connected to move said secondary relay element to follow the positions of said primary element.

2. Motion transmission system comprising, in combination, a pressure fluid relay including a primary relay element mounted for full rotations about an axis and a secondary relay element mounted for full rotations coaxially to said primary element; stops for limiting the relative movement between said primary and secondary relay elements; rotary actuating means for actuating said primary relay element, said actuating means including a spring member adapted to store an actuating motion exceeding the relative freedom between the relay elements; and a rotary pressure fluid motor controlled by said pressure fluid relay and connected to move said secondary relay element to follow the positions of said primary element.

3. Motion transmission system comprising, in combination, a pressure fluid relay including a primary relay element mounted for full rotations about an axis and a secondary relay element mounted for full rotations coaxially to said primary element; means for limiting the relative movement between said primary and said secondary relay elements; rotary actuating means for actuating said primary relay element, said actuating means including a resilient member adapted to store an actuating motion exceeding the relative freedom between the relay elements; a rotary pressure fluid motor controlled by said pressure fluid relay; and an electric transmitter and a repeater motor operated by said pressure fluid motor and connected to move said secondary relay element to follow the positions of said primary element.

4. Motion transmission system comprising, in combination, a jet-pipe relay including a jet-pipe mounted for full rotations about an axis and a reception orifice member mounted for full rotations coaxially to said jet-pipe; means for limiting the relative movement between said jet-pipe and said orifice member; rotary actuating means for actuating said jet-pipe, said actuating means including a resilient member adapted to store an actuating motion exceeding the relative freedom between said jet-pipe and orifice member; and rotary pressure fluid motor controlled by said jet pipe relay and connected to move said orifice member to follow the positions of said jet-pipe.

5. Motion transmission system comprising, in combination, a pressure fluid relay including a jet-pipe mounted for full rotations about an axis and a reception orifice member mounted for full rotations coaxially to said jet-pipe; stops for limiting the relative movement between said jet-pipe and said orifice member; rotary actuating means for actuating said jet-pipe, said actuating means including a spring member adapted to store an actuating motion exceeding the relative freedom between said jet-pipe and orifice member; and a rotary pressure fluid motor controlled by said pressure fluid relay and connected to move said orifice member to follow the positions of said jet-pipe.

6. Motion transmission system comprising, in combination, a jet-pipe relay including a jet-pipe mounted for full rotations about an axis and a reception orifice member mounted for rotations coaxially to said jet-pipe; means for limiting the relative movement between said jet-pipe and said orifice member; rotary actuating means for actuating said jet-pipe, said actuating means including a resilient member adapted to store an actuating motion exceeding the relative freedom between said jet-pipe and orifice member; a rotary pressure fluid motor controlled by said jet-pipe relay; and an electric transmitter and a repeater motor operated by said pressure fluid motor and connected to move said orifice member to follow the positions of said jet-pipe.

7. Motion transmission system comprising, in combination, a jet-pipe relay including a relatively movable rotating jet-pipe and distributor block; means for limiting the relative movement between the jet-pipe and the distributor block; means for actuating said jet-pipe including a resilient member adapted to store an actuating motion exceeding the relative freedom between the jet-pipe and the distributor block; and a motor controlled by said jet-pipe relay and connected to move said distributor block to follow the positions of said jet-pipe.

8. Motion transmission system comprising, in combination, a jet-pipe relay including a rotating jet-pipe and a rotating distributor block of which both are relatively movable; means for limiting the relative movement between the jet-pipe and the distributor block; means for actuating said jet-pipe including means adapted to store an actuating motion exceeding the relative freedom between the jet-pipe and the distributor block; and a prime mover conrolled by said jet-pipe relay and connected to move said distributor block to follow the positions of said jet-pipe.

9. Motion transmission system comprising, in combination, a jet-pipe relay including a rotating jet-pipe and a rotating distributor block of which both are relatively movable; means for limiting the relative movement between the jet-pipe and the distributor block; means for actuating said jet-pipe including a resilient member adapted to store an actuating motion exceeding the relative freedom between the jet-pipe and the distributor block; and power means controlled by said jet-pipe relay and connected to move said distributor block to follow the positions of said jet-pipe.

HERBERT ZIEBOLZ.